Figure 1:
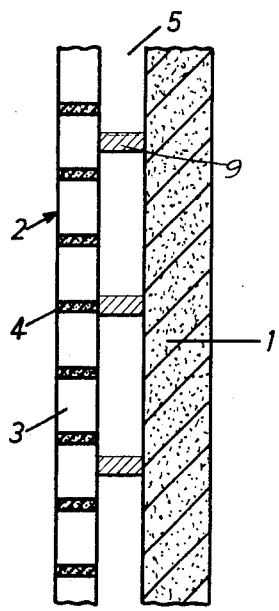

June 9, 1942.  W. ESSER  2,285,423

SOUND ABSORBING MATERIAL

Filed Aug. 9, 1938

INVENTOR
Wilhelm Esser.

BY Rule & Hoge
ATTORNEYS

Patented June 9, 1942

2,285,423

UNITED STATES PATENT OFFICE 2,285,423

SOUND ABSORBING MATERIAL

Wilhelm Esser, Bergedorf, near Hamburg, Germany

Application August 9, 1938, Serial No. 223,808
In Germany August 10, 1937

3 Claims. (Cl. 154—44)

This invention relates to improvements in sound absorbing materials adapted to be used as coverings for walls of theaters, auditoriums, etc., or in any other cases where it is desired to control, reduce or avoid the transmission of sound.

It is already known to employ mats of glass fibres as sound absorbing coverings and these have proved quite satisfactory to a great extent, but it has been found that the fine-graded porous mats employed hitherto only absorb sounds of frequencies higher than about 300 Hertz, while they do not deaden the sounds of lower frequency.

The invention has for its object to provide a sound absorbing material which does not possess the aforesaid drawbacks and which is greatly superior to the known fibrous mats as regards the absorption of sounds of any frequency.

Figure 2:
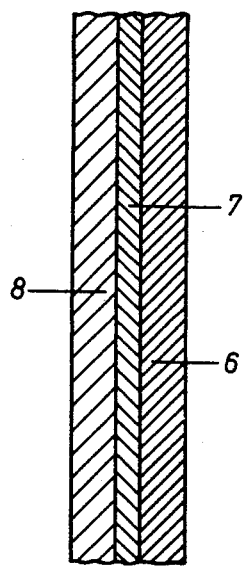

In the drawing:

Fig. 1 is a vertical longitudinal section of a sound absorbing covering according to the invention comprising two layers, and Fig. 2 is a similar section of a modified form of covering comprising three layers.

According to the invention, the sound absorbing material consists of several porous layers with the pores of the different layers being of different size. The layers may be arranged in spaced relation and the intermediate air spaces thus formed subdivided by suitable partitions normal to the surfaces of the layers. These partitions may be in the form of furring strips of suitable material and may be formed of sound absorbing material if desired. Mineral fibres are well suited as a base for the several layers which may be formed wholly or partly of such fibres. In a preferred embodiment the layers are made from glass fibres or the like. To give the layers satisfactory strength and coherence the fibres may be bonded or cemented together by means of a suitable binding medium or adhesive. Instead of uniting several layers with different pore sizes, the material may also be made of one layer having pores increasing or decreasing in size from one surface of the layer to the other. In some cases, the layers or certain of them may be provided with relatively large perforations extending vertically or at an angle to the layer surfaces.

Referring now to the drawing, the sound absorbing covering illustrated in Fig. 1 comprises two layers 1 and 2. The layer 1 preferably consists of glass fibres in matted, felted, knitted or woven form. It may be composed of a series of superposed thin webs of criss-crossed glass fibres.

The fibres or fibrous webs can be held together by cementing, stitching or in any other approved manner. Preferably the fibres are bonded at their points of contact by a suitable adhesive.

The other layer 2 is provided with relatively large perforations 3 formed by partitions 4 which may be arranged so as to give the layer an alveolate structure. The two layers 1 and 2 may be arranged in spaced relation as illustrated in Fig. 1, so that an air space 5 is left between them which may be subdivided by appropriately distributed transverse partitions such as the partitions 9, or wholly or partly filled with a sound absorbing substance. The intermediate space may also be omitted and the two layers 1 and 2 arranged in direct contact with each other.

Various materials may be used for forming the layer 2. It may consist of a ceramic material, such as perforated bricks. Other suitable materials are wood, cork or the like, and it may also consist wholly or partly of glass fibres or other mineral fibres.

The fibrous material used for layer 1 and/or layer 2 may also be slag-wool, asbestos or the like, or minearalised textile fibres.

With the embodiment shown in Fig. 2, the entire sound absorbing covering consists of a fibrous substance, preferably glass fibres. It is composed of three layers 6, 7 and 8 with different pore sizes. In the embodiment illustrated the pores of layer 7 are assumed to be greater than the pores of layer 6, and the pores of layer 8 greater than those of layer 7. Coverings of this character can be obtained by uniting webs, mats or the like of glass fibres with each of them having a different size of pores. The covering may also be made of a single coherent fibrous body having pores of sizes gradually increasing or decreasing from one surface of the layer toward the other.

The unit shown in Fig. 2 or some of its layers, for instance layer 8, may be provided with relatively large perforations, holes or ports.

Modifications may be resorted to within the spirit and scope of the present invention.

Having thus described my invention, what I claim as new and desire to secure by Letters Patent is:

1. A sound-absorbing structure comprising a pair of layers of different sound absorbing characteristics, each consisting of inorganic fibers in mat formation, whereby they are porous throughout, the outer one of said layers having perforations extending therethrough and spaced apart distances less than their cross-sectional dimensions, the other of said layers having a continuous sound-incident surface that underlies said perforated layer, said layers being arranged in parallelism and spaced apart, and partitions within and subdividing the spaces between said layers.

2. A sound-absorbing structure comprising a mat of fibrous mineral material having a substantially continuous sound-incident surface, and a second mat of fibrous mineral material of substantially alveolate form having different sound-absorbing characteristics than the first and overlying the sound-incident surface of the first mat, the perforations in said second mat being extended completely through the mat and the cross-sectional dimensions of said apertures being several times greater than the thickness of the walls separating said apertures to expose the major portion of the said sound-incident surface of said first mat.

3. A sound-absorbing structure comprising a mat of fibrous mineral material having a substantially continuous sound-incident surface, a second mat of fibrous mineral material of substantially alveolate form having different sound-absorbing characteristics than the first and overlying the sound-incident surface of the first mat in spaced relation thereto, the apertures in the second mat being extended completely therethrough and the cross-sectional dimension of said apertures being greater than the thickness of the walls separating said apertures to expose the major portion of the said sound-incident surface of said first mat, and partitions bridging the space between the mats and dividing said space into a multiplicity of smaller spaces.

WILHELM ESSER.